(12) United States Patent
Fomin et al.

(10) Patent No.: US 9,667,023 B2
(45) Date of Patent: May 30, 2017

(54) ULTRA-HIGH POWER SINGLE MODE FIBER LASER SYSTEM WITH NON-UNIFORMLY CONFIGURE FIBER-TO-FIBER ROD MULTIMODE AMPLIFIER

(71) Applicant: IPG Photonics Corporation

(72) Inventors: Valentin Fomin, Siegen (DE); Anton Ferin, Burbach (DE); Mikhail Abramov, Burbach (DE); Igor Samartsev, Westborough, MA (US); Valentin Gapontsev, Worcester, MA (US)

(73) Assignee: IPG Photonics Corporation, Oxford, MA (US)

( * ) Notice: Subject to any disclaimer, the term of this patent is extended or adjusted under 35 U.S.C. 154(b) by 0 days.

(21) Appl. No.: 14/199,397

(22) Filed: Mar. 6, 2014

(65) Prior Publication Data

US 2014/0314106 A1    Oct. 23, 2014

Related U.S. Application Data

(60) Provisional application No. 61/773,377, filed on Mar. 6, 2013.

(51) Int. Cl.
*H01S 3/30* (2006.01)
*H01S 3/067* (2006.01)
*H01S 3/10* (2006.01)

(52) U.S. Cl.
CPC .......... *H01S 3/06708* (2013.01); *H01S 3/067* (2013.01); *H01S 3/10* (2013.01)

(58) Field of Classification Search
CPC ......... H01S 3/06708; H01S 3/10; H01S 3/067
USPC ........................................ 372/6, 72; 385/127
See application file for complete search history.

(56) References Cited

U.S. PATENT DOCUMENTS 6,324,326 B1 *   11/2001   Dejneka et al. ................. 372/6
2006/0280217 A1 *  12/2006   Zervas et al. .................. 372/72

* cited by examiner

*Primary Examiner* — Tuan Nguyen
(74) *Attorney, Agent, or Firm* — Timothy J. King, Esq.; Yuri Kateshov, Esq.

(57) ABSTRACT

A high power fiber laser system includes a booster winch is configured as a fiber amplifier extending over free space, pump source and laser head including a reflective element which receives pump light and reflects toward the output end of the booster in a counter signal-propagating direction. The booster is configured with concentric and coextending frustoconically shaped ("MM") core and cladding around the core. The core includes a mode transition region expanding between small diameter SM input and large diameter MM output core ends and configured so that amplification of high order modes is substantially suppressed as a single mode ("SM") signal light propagates from the input to output core ends. The laser head receives output ends of respective pump light delivery fibers and signal fiber, respectively. The pump source is structured with a plurality of independent sub pumps arranged around the booster. The laser head supports a segmented mirror configured to reflect pump lights from respective pump sub-sources to the output end of the booster in a counter propagating direction, wherein the booster is configured to emit the amplified signal light reaching up to MW power levels substantially in the SM.

26 Claims, 4 Drawing Sheets

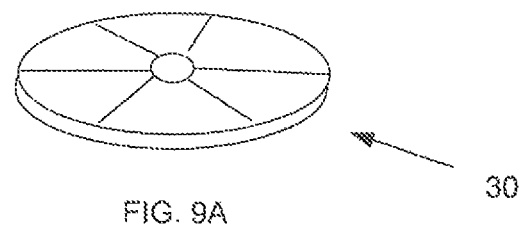
FIG. 9A
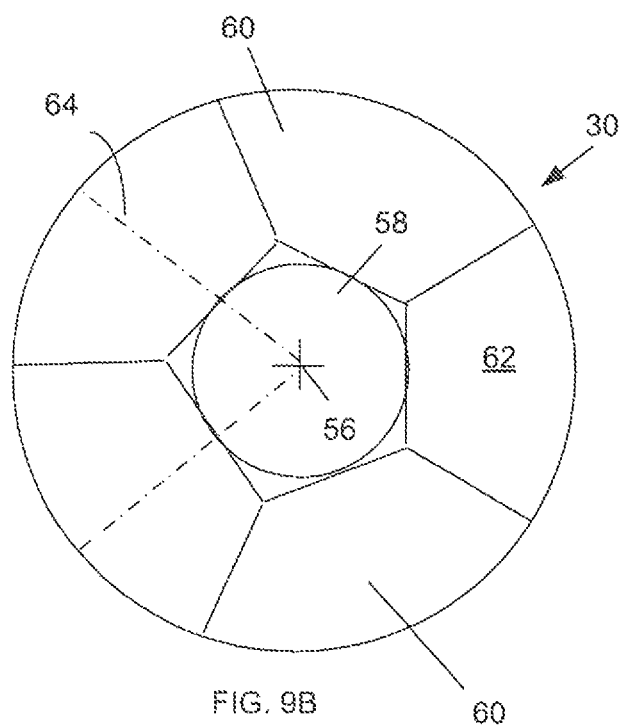
FIG. 9B
FIG. 9C
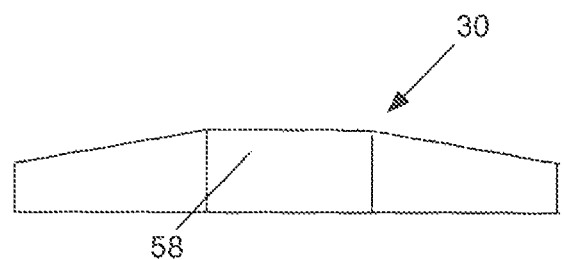

ULTRA-HIGH POWER SINGLE MODE FIBER LASER SYSTEM WITH NON-UNIFORMLY CONFIGURE FIBER-TO-FIBER ROD MULTIMODE AMPLIFIER

FIELD OF THE DISCLOSURE

The disclosure relates to high power fiber laser systems operative to emit tens of kW- and mW-levels average and peak power outputs, respectively, in substantially a fundamental mode. Particularly, the disclosure relates to a compact single mode ("SM") high-power fiber laser system configured with a plurality of unconfined and spaced amplifier and pump light output fibers all directly coupled to a remote laser head which redirects pump light in a counter-propagating direction into the output end of the amplifier.

BACKGROUND OF THE DISCLOSURE

The dramatic rise in output power from rare-earth-doped fiber sources over the past decade led to a range of fiber-laser system with outstanding performance in terms of output power, beam quality, overall efficiency, compactness and wavelength flexibility. In general, the upsurge in output power became possible due to several factors including, among others, development of large mode diameter double clad ("LMADC") fibers and the increase in the power and brightness of semiconductor diode pumps briefly discussed below.

The development of active DC fibers is associated with increasing core size which lowers susceptibility to nonlinear effects ("NLE") due to a large mode area, improves the core-to-cladding area ratio and enhances pump absorption. However, the large-diameter cores supporting substantially only a SM also impose significant constrains in step-index fibers. As known to one of ordinary skill in the fiber laser art, a SM fiber is characterized by normalized frequency parameter $V=R_{co} (2\pi/\lambda)\sqrt{\Delta n}$ equal to bout 2.405, where $R_{co}$-core radius, $\Delta n = n_{core}^2 - n_{clad}^2$. To prevent generation of high order modes in DC fibers, thus, a NA of fiber should be considerably reduced which leads to weak guiding in the core causing, in turn, the fiber to be overly sensitive to bending losses.

The development of modern laser diode pumps also mightily contributes to the continuous power increase and brightness particularly when diode pumps are used in combination with LMADC fibers. However, the level of pump power is not limitless due to many factors including the known geometries of fiber amplifiers which limit the scalability of fiber devices, as discussed below.

Referring to the fiber systems including a pump/DC configuration, pump absorption depends on the core/clad diameter ratio of amplifying fibers. The core size cannot be enlarged above a certain value because of the excitation and amplification of high order modes ("HOMs") which, if excited, immediately decrease the quality of the output light below acceptable levels. The limited core dimensions also restrain the size of the clad since, otherwise, the core/clad diameter ratio would be unacceptably reduced which, in turn, would decrease the brightness and absorption of pump light. As a consequence, the limitation in the clad and core diameters affects the amount of pump light which, in turn, limits power of fiber amplifiers.

Recently, the fiber laser industry has turned to crystal fiber rods typically used in output stages of amplifier chains to address the scalability of fiber amplifiers. Based on airhole clad technology, a crystal fiber rod includes a double clad structure with an inner cladding defining an increased diameter pump core.

The doped core of the fiber rod has a very small NA, and is made from fused silica/quartz which typically hosts a low dopant concentration. The above-mentioned characteristics may detrimentally affect the scalability of a laser system based on a fiber rod as explained below.

A low numerical aperture, which typically does not exceed about 0.02, limits the amount of high power pump light which may be coupled into the core in amounts necessary for reaching ultrahigh powers in a kW-MW range depending on whether a laser system operates in CW or pulsed regimes. Accordingly, a sufficient amount of pump light can be coupled only into the pump core/inner cladding. One of ordinary skill in the fiber laser arts knows that absorption of clad-coupled pump light is about 8 times less than that of core-coupled light. To fully utilize clad-coupled pump light, thus, a fiber rod should have, a length varying between several tens (typically exceeding 50) of centimeters and meters. Even the shortest available fiber rod thus is detrimentally affected by the presence of NLEs. The latter, of course, critically limits the laser's power scalability.

A low concentration of ions, such as ytterbium ("Yb"), is typically about 700 ppm. With such a low dopant concentration, absorption of pump light is also low. For example, in certain applications the use of a Nd-doped fiber laser pump at 920 nm is highly desirable. However absorption at 920 nm by a small concentration of Yb dopants is particularly low. To provide adequate absorption, the overall length of a fiber rod should be increased. As discussed above, increasing the overall length lowers a threshold for NLEs which, in turn, limits the amplifier's power scalability.

An open-end structure of fiber rods is also problematic. Typically, launching an input signal throughout air gaps can be realized only by micro-optics. The latter, of course, complicates the overall laser configuration making it cumbersome and expensive. The presence of air in gaps or holes lowers thermal conductivity properties. In particular, the air holes slow dissipation of heat which, in turn, may damage the rod itself and cause an environmental hazard.

The known high power fiber laser systems are far from being compact which is highly desirable due to typically limited space in which these systems are deployed. In addition to substantial lengths of fiber waveguides, as a rule, the known systems include a long delivery passive fiber guiding the amplified signal light to the workpiece or surface to be laser treated. Subject to the local requirements, the length of a delivery cable is practically unlimited and can reach tens of meters and more. Besides the compactness, the use of passive fiber delivery cables also affects power losses. A delivery cable should be spliced directly or indirectly to the output of the amplifier fiber which may result in splice power losses of signal light. Even low power losses are undesirable in a highly competitive world of high power fiber laser systems.

A need therefore exists for an amplifying fiber configured to absorb more than about 90% of multi-kW multimode ("MM") pump light along a relatively short fiber length and emit a multi-kW output in substantially a fundamental mode.

Another need exists for the above-described amplifying fiber configured with a NA considerably higher than that of regular LMADC fibers.

Still another need exists for an ultra-high power fiber laser system with the described above amplifier fiber delivering amplified pump light directly to a laser head.

A further need exists for the ultra-high power fiber laser system configured with a multi-kW pump system emitting pump light which is controllably coupled into the desired region of the inner cladding of the amplifying fiber.

SUMMARY OF THE DISCLOSURE

According to the disclosure, the disclosed high power fiber laser system is operative to emit multi-kW such as about 20 and higher kW, signal light in substantially a fundamental mode. The system is configured with a stationary console including one or more cabinets each including pump sources, optional preliminary amplifying cascades, electronics, cooling systems and all other devices necessary to emit a high power SM output. A portable laser head is provided with beam guiding optics and spaced from the console. A delivery cable traversed by a fiber amplifier or booster extends between the console and laser head. A plurality of pump light delivery fibers extend over free space and deliver pump light directly to the laser head which is configured with bulk optics structured to redirect pump light into the output end of the booster, which is also directly coupled to the head, in a counter propagating direction.

The booster's geometry includes an unconfined double clad ("DC") amplifying MM fiber structured with a fiber portion and fiber rod portion which together define a bottle-neck-shaped cross section. Thus, the geometry of the fiber portion includes a uniformly dimensioned, small-diameter input end core region, which is dimensioned to support a SM received from an upstream SM passive fiber. The fiber rod portion is configured with a core region expanding along the fiber rod portion and having the uniformly dimensioned output end which is capable of supporting multiple high order modes ("ROM"). With a mode transforming tapered portion located between the input and output core portions, this configuration is structured to increase the MFD of the exited SM in amplifying fibers without meaningful amplification of HOMs, raise the pump power and reduce the fiber length so as to hoist a threshold for non-linear effects.

In accordance with one embodiment of the disclosed pumping scheme, a cladding receives the pump light coupled into the output end of the fiber rod. The cladding may be provided with a specifically doped ring region splitting the cladding into inner and outer sub-claddings maximizing the absorption of pump light by increasing the core/cladding ratio. The latter becomes possible since te ring region is designed to confine pump light to the inner sub-cladding.

A further aspect of the disclosure includes pumping high power MM pump light into the large-diameter core end of the fiber rod. The pump light is characterized by a NA lower than that of the inner sub-cladding and even more preferable lower than the core portion which is substantially equal to or greater than 0.1. In combination, the counter-propagating direction, specified above NA of pump light and large mode field diameter of the FM provide favorable conditions for the effective absorption of pump light along a very small axial length of the tapered core part. The latter does not exceed about 30 cm, but preferably is about 10 cm long. With such a limited length, a threshold for NLEs is extremely high and, therefore, the power scaling can be considerably improved up to MW-level peak powers in the single fundamental mode or very few HOMs.

The delivery cable traversed by the booster is dimensioned to provide a sufficient space receiving a cooling medium. The latter may include a water cooling system or, alternatively, may be formed as an additional polymeric layer coated along the outer surface of the booster.

The amplifying fiber or booster is spaced from flexible unconfined MM output passive fibers of respective pump sources. The fibers are spaced from one another so as to provide the desired flexibility of the disclosed system during its operation. The downstream ends of respective MM passive fibers each are removably coupled to the laser head by means of a connector assembly. The latter is configured with a focusing lens and a lens positioning mechanism operative to displace the lens in an X-Y-Z system of coordinates. The peripheral connectors receiving respective downstream ends of the passive fibers are mounted on the laser head in a spaced manner and surround a central connector receiving the downstream end of the active fiber. The laser bead encloses a segmented mirror which, in combination with the adjustable lenses, controllably redirects the pump light beams in a counter-propagating direction so that the pump light beams are incident on respective segments of the mirror. The configuration of the connectors allows an easy replacement of damaged fibers and/or lenses, whereas the laser head is configured with an easy access to the mirror which thus can be replaced if needed. Accordingly, the system has a modular structure.

The disclosed booster stage is very compact compared to the known, similarly powerful fiber laser systems of the prior art. Its compactness is a result, among others, of the amplifying fiber that also functions as a delivery fiber guiding amplified signal light directly to the laser bead. As a consequence, not only the overall system's dimension is reduced, but also the system experiences smaller power losses which allows high power outputs in substantially a fundamental mode.

BRIEF DESCRIPTION OF THE DRAWINGS

The above and other features and advantages of the disclosed system will become more readily apparent from the following specific description accompanied with the drawings, in which:

FIGS. 9A-9C are respective isometric, bottom and side views of the disclosed reflective element configured to couple pump light into the desired region of the disclosed booster's large-diameter output end in a counter-propagating direction.

SPECIFIC DESCRIPTION

Figure 1:
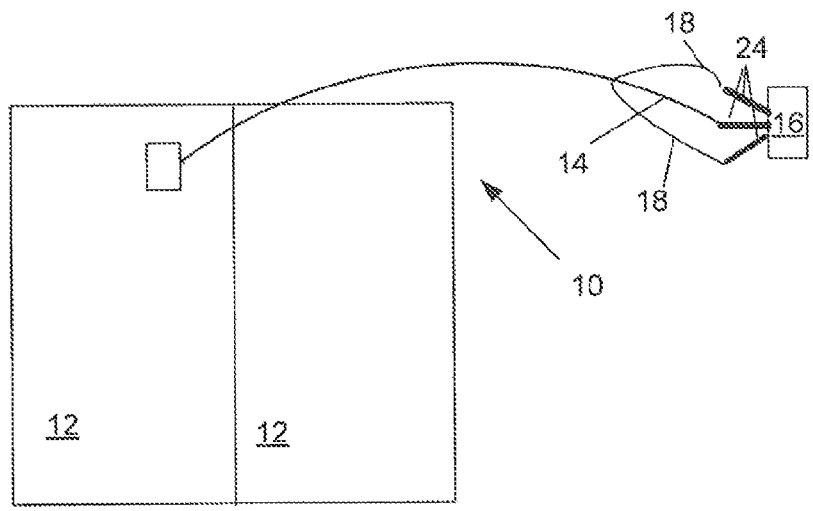
FIGS. 1 and 2 illustrate the inventive high power SM fiber laser system.

Reference will now be made in detail to embodiments of the invention. Wherever possible, same or similar numerals are used in the drawings and the description to refer to the same or like parts or steps. The drawings are in simplified form and are not to precise scale. Unless specifically noted, it is intended that the words and phrases in the specification and claims be given the ordinary and accustomed meaning to those of ordinary skill in the fiber laser arts. The word "couple" and similar terms do not necessarily denote direct and immediate connections, but also include mechanical optical connections through free space or intermediate elements.

FIG. 1 illustrates an exemplary high power fiber laser system 10 capable of emitting multi-kW, such as about 20 kW and higher substantially SM signal light in a CW regime and MW peak power in a pulsed regime. The system 10 may be configured with one or a plurality of cabinets 12 including pump sources, seed laser 11, optional pre-amplifying cascade(s), electronics, cooling systems and all other devices necessary to emit a high power SM output. The SM signal light emitted by a seed laser is further guided along and amplified by a fiber booster 14 enclosed within a flexible delivery cable 50 which extends over free space between the console and a laser head 16. The booster 14 is configured as an active double clad fiber with a MM core doped with light emitters, such as rare-earth elements. A plurality of pump light delivery/output fibers 18 (FIG. 2), also extending over free space, and necessary bulk optics structured to couple pump light into the amplifier fiber in a counter-propagating direction, are mounted to laser head 16. Due to the structural specifics of booster 14 along with pumps and laser head 16, system 10 is operative to emit an ultra-high power, substantially diffraction limited output beam in a signal light propagating direction.

Figure 2:
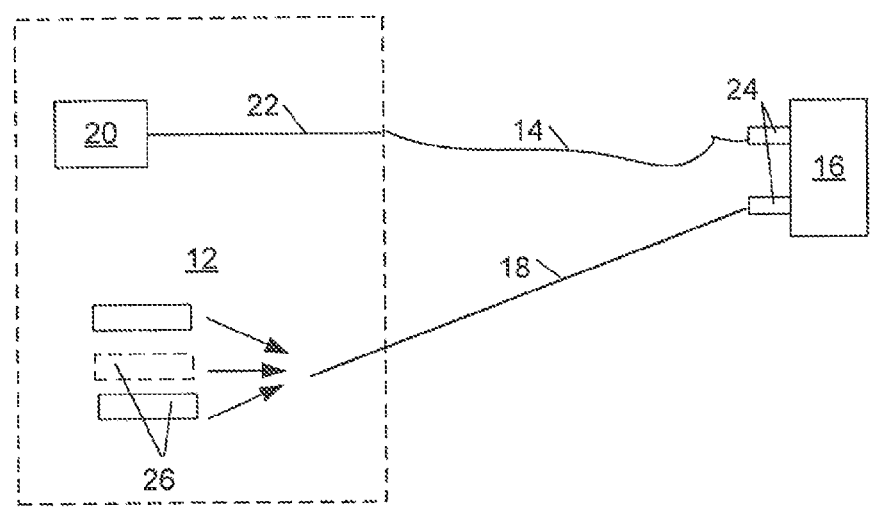

FIG. 2 illustrates system 10 configured with a master oscillator/power amplifier ("MOPA") configuration. A master oscillator 20 is located in cabinet 12 and operative to emit a single mode ("SM") signal light at the desired wavelength in a signal light propagating direction. The oscillator 20 may have a variety of configurations including, for example, a Yb-doped fiber oscillator operative to emit the signal light at about at a wavelength, ranging within a 1012-1060 nm range, which is guided along an input passive fiber 22 spliced to the input end of booster 14, preferably within cabinet 12. The output end of booster 14 is mounted to laser head 16 by means of a connector 24. The system 10 further includes a plurality of pump assemblies 26 located within cabinet 12 and outputting MM pump light, for example, in a wavelength range varying between about 975 and about 1018 nm. The pump assemblies 26 are combined together in parallel to output pump light coupled into pump light delivery fiber 18, as discussed in detail hereinbelow.

Figure 3:
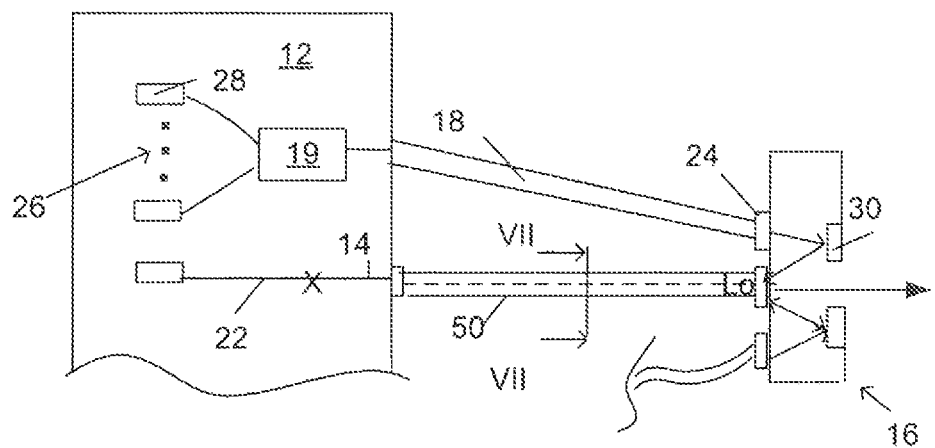
FIG. 3 illustrates an optical schematic of the system of FIGS. 1 and 2.

Referring to FIG. 3, exemplary pump assembly 26 may include a multiplicity of pigtailed laser diode 28 typically arranged in multiple modules each of which may include more than one diode. The output fibers from respective laser diode modules 28 are combined together in MM-MM fiber combiner 19 which has an output MM passive fiber pump light output/delivery fiber 18. As an example, 19 combined laser diode modules 28 each emitting MM pump light can be combined together in MM pump fiber 18. The output pump fibers 18 of respective pump assemblies 26 are received in respective connectors 24 removably mounted to laser head 16. The disclosed system 10 may have the combined power of pump light reaching more than 20 kW. Received in laser head 16, multiple pump lights are reflected from a segmented mirror 30 mounted in the laser head and operative to couple pump light into the output end of booster 14 in a counter-propagating direction, as disclosed hereinbelow.

Figure 4:
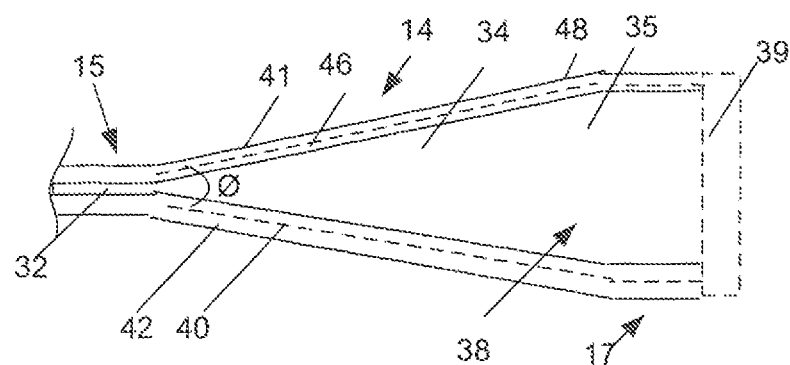
FIG. 4 is a cross-sectional view of one of the embodiments of the disclosed booster.

Referring to FIG. 4 in combination with FIGS. 2 and 3, booster 14 has its input end spliced to passive input fiber 22 within cabinet 12 and is for example, about 5 meter long. The configuration of booster 14 can be generally referred to as a fiber to fiber rod waveguide including a fiber portion 15 and a fiber rod portion 17 with the latter having a length ranging from a few centimeters to a few meters. For example, fiber rod portion 17 may vary from about as small a length as about 10 cm long. Alternatively, booster 14 may be configured with separate portions spliced together. In either case, booster 14 is configured to emit radiation in substantially a fundamental mode ("FM"). The fiber portion 15 is configured with a distant end having generally a frustoconical shape with a small diameter downstream end receiving the SM or low high order mode signal light from fiber portion 15 at the desired wavelength $\lambda$s, and a large-diameter output end capable of supporting multiple modes.

The booster 14 may include, for example, a phosphate MM core 38 having a uniform cross section 32, frustoconical cross-section 34 and large diameter uniformly shaped output portion 35. Alternatively, MM core 38 may be configured only with input and frustoconical sections 32 and 34, respectively. The input core region 32 is dimensioned to support substantially only a single mode or very few low HOMs which adiabatically expands along a mode transition tapered core region to a large diameter output core region 35 so as to minimize and desirably suppress excitation of HOMs, as disclosed in detail below. The core 38 is further configured with a cylindrical or frustoconical quartz block 39 structured to reduce power density of the output signal light. A single or multiple coatings 41 surround cladding 42 and have respective refractive indices progressively lower than that of the coating which in, turn, lower than that of the cladding. The inner coating may have a thickness varying between about 20 $\mu$m and about 40 $\mu$m, while the outer coating's thickness may vary between about 20 and about 35 $\mu$m.

The input core region 32 is configured to receive and support SM signal which further expands along a mode transition core region 34. The single mode covers more than about $0.65^2$ of the cross-sectional area of core 38 along the entire length of the latter. Such a large mode area of the SM allows a major part of pump light to be used for amplification of only the SM/FM to the degree that all possible HOMs, which exist in amplifying core region 35, are practically reduced to a background noise.

A pumping scheme of disclosed booster 14 is configured in accordance with an output end counter-pumping technique. In one embodiment of the pumping scheme, mirrors 30 (FIG. 3) are configured to reflect pump light into cladding 42 (FIG. 4) of booster 14, as disclosed in detail below. In accordance with this embodiment, cladding 42 includes a ring region 40 splitting the cladding into inner and outer sub-claddings 46 and 48, respectively.

The ring region 40 of booster 14 helps increase brightness and enhances absorption of pump light. The ring region 40 is doped with fluoride characterized by refractive index which is lower than that of cladding 42 and thus effectively reduces the diameter of the cladding area crossed by pump light to inner sub-cladding 46 with an NA exceeding 0.22. The reduced cladding area increases an optical path of pump light through core 38 so as to improve its absorption.

As light propagates along a gradually narrowing cross-section of booster 14, its NA tends to increase so that the light starts decoupling from the waveguide. The decoupled light is lost for the desired amplifying purposes and damaging to protective coatings of fiber components. Such a decoupling is magnified in high power systems operating at kW-MW levels in which even an insignificant power loss can be seriously degrade the system's performance. Accordingly it is highly desirable that pump light be maximally absorbed along amplifying and mode transition regions 35 and 34, respectively, before the pump light's NA becomes is so enlarged that it starts bleeding through ring region 40 into outer sub-cladding 48.

In this regard, as known to one of ordinary skill in the fiber laser art, not all modes of MM pump light are absorbed uniformly in a DC fiber, and some propagate without absorption at all which, as easily recognized by one of ordinary skill, depends on the overlap between any given mode and core areas. Absorbable modes, such as LP01 and higher, i.e., symmetric modes with an intensity distribution centered along the fiber's short axis of symmetry, propagate at respective large angles relative to the fiber's longitudinal axis. Other less or not at all absorbable modes include asymmetric modes, such as LP11 and higher and carry a significant portion of the pump power but, as well known from ray optics, have a spiral trajectory providing at best the insignificant overlap with the doped core area.

The absorption of a major part of pump light before it starts bleeding through ring 40 is realized by configuring an opening angle Ø of the tapered region of booster 14. The opening angle is selected so that each of pump light rays incident on ring 40 reflects with a progressively increasing reflection angle. As a result, the frequency at which the pump light crosses the mode transition core region 34 increases which in turn leads to its intensified absorption.

The pump light is multimode. As known, symmetrical modes propagate along a waveguide at an angle which is larger than an angle of asymmetrical modes, asymmetrical modes overlap the doped area of MM core 38 less than the symmetrical modes. The opening angle Ø of the tapered region is thus selected to increase reflective angles of pump rays incident on ring 40 so that not only symmetrical modes, but also asymmetrical modes effectively interact with light emitters doped in MM core 38. In particular, the opening angle Ø is such that the desired amount of pump light is absorbed along a desired length of core mode-transition region 34. The desired length is the length of mode transition region 34 along which the pump light, propagating along the booster, is confined by ring 44, i.e., before the NA of pump light increases so that light starts bleeding into outer sub-cladding 48. The threshold for absorbed pump light should at least 90% along the core length not exceeding for example 5 meters with the mode transition core region of about 4 meters.

The disclosed booster 14 may be configured with a tapering ratio, i.e., ratio between small-diameter and large-diameter ends of the tapered region, of about at least 2. Based on the latter, opposite ends of the ring may be about 15 μm thick and about 30 μm thick, respectively. The ratio between diameters of respective inner sub-cladding and core may be at least about 5, while the ration between diameters of respective outer sub-cladding and core is about 10. For example, the diameter of the input core end may be about at least 20 μm thick while the diameter of the output core end is at least 40 μm, whereas outer diameters of respective small-end and large end of the cladding are about 200 μm and about 400 μm, respectively.

Preferably, output pump light delivery fibers 18 each are configured with an NAp substantially the same as a NAic of inner sub-cladding 46. Alternatively, the Nap may be greater than that of the inner cladding since the laser system operates at such high power levels, that a power loss of 1-2% would not affect the desired results. Finally, the possibility of having the pump NAp lower than the NAic is also possible.

Figure 5:
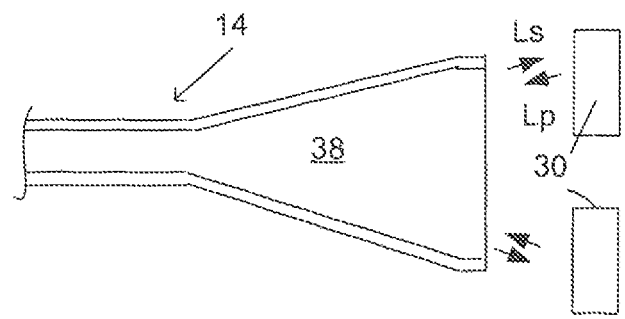
FIG. 5 is a cross-sectional view of an alternative embodiment of the disclosed booster.

FIG. 5 illustrates an alternative embodiment of the disclosed pumping scheme including reflecting pump light Lp into the output end of booster 14 so that it is coupled into MM core 38. This is realized by providing pump light with an NAp lower than that of core 38 which is substantially equal to or greater than 0.1. In combination, the counter-propagating direction, specified above NA of pump light and large mode field diameter of the FM provide favorable conditions for the effective absorption of pump light along a very small axial length of the tapered core part.

Figure 6:
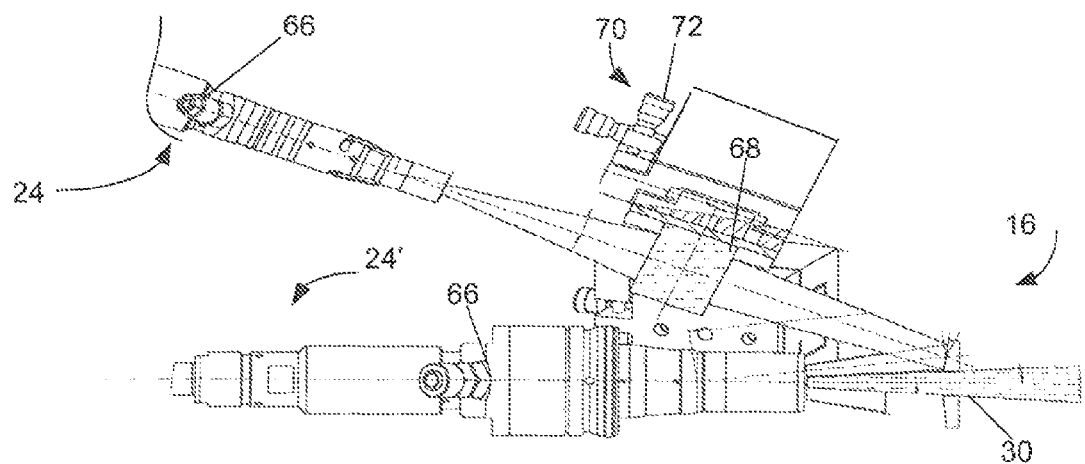
FIG. 6 is an elevated view of pump and signal channels of the inventive system of FIG. 1.

FIG. 6 illustrates connector assemblies 24 and 24 for coupling pump output fibers and fiber booster, respectively, to laser head 16. One of the connector's parts receives the downstream end of a fiber, whereas the other part is fixed to laser head 16. The connectors are designed to provide easy coupling and decoupling of respective fibers to and from laser head 16 for a variety of reasons including, for example, replacing a damaged fiber.

The downstream ends of respective MM passive and DC active fibers each are received in the male part of the connector. As a consequence, the downstream ends of all fibers are radially spaced from one another. In addition, power sensors 66 are mounted to respective male connector parts so as to monitor output powers of respective pump and signal lights. If a measured power of light in any given pump and amplifying channel does not correspond to the desired reference value, the current at the pump input is adjusted to increase a light power.

The female parts are removably mounted to laser head 16, and female parts of connector assemblies 24 that are associated with pump light each receives a focusing component, such as a lens 68. The lens 68 is configured to focus pump light on the desired segment of mirror 30 which reflects the focused beam in a counter-propagating direction, if the reflected pump light is not incident on the desired region, lens 68 may be displaced along X-Y-Z directions by an adjusting mechanism 70 which includes three actuators 72 each operative to displace lens 68 in the desired plane. As a result, the configuration of connector assemblies 24, 24' and adjusting mechanism 70 allows each lens to be individually adjusted. Furthermore, based on the foregoing, each of the above disclosed components is replaceable if a need arises.

Figure 7A:
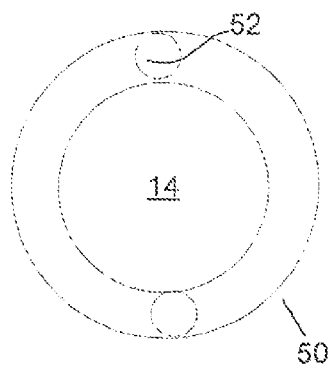
FIGS. 7A and 7B are respective views along lines VII-VII of FIG. 3 illustrating alternative arrangements for a cooling assembly.

Turning to FIGS. 7A and B in combination with FIG. 4, a delivery cable 50, surrounding booster 14, is dimensioned to accommodate a cooling system within a space between opposing surfaces of respective cable and booster. The cooling system is configured to minimize undesirable consequences of thermodynamic loads resulting from ultra-high power light guided through booster 14. In one embodiment as shown in FIG. 7A, a guide 52 including one or a combination of pipes which extend from the console through substantially the entire length of booster 14. The pipe 52 guides a pressurized cooling medium, such as water.

Figure 7B:
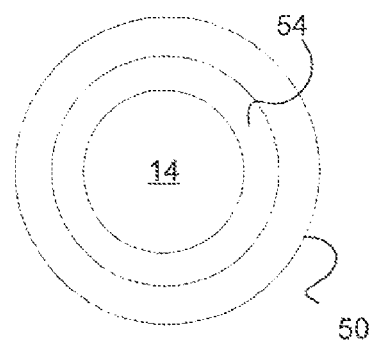

Alternatively, FIG. 7B illustrates a thick polymeric layer 54 minimizing detrimental thermal effects of high power light. The layer 54 may be coated along the entire length of booster 14 or a part thereof Materials used for manufacturing layer 54 may include fluoropolymer having a refractive index below 1.33, an operating temperature of up to about several hundreds of ° C., and a thickness between about 6 to about 50 um.

Figure 8:
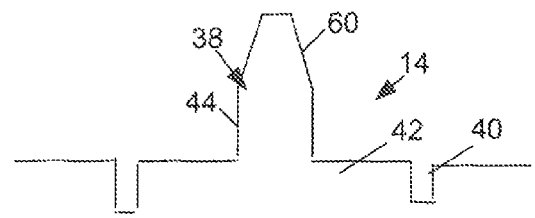
FIG. 8 is a refractive index profile of the MM active fiber of the booster of FIG. 5.

FIG. 8 illustrates a refractive step index profile of booster 14 of FIG. 4. The core 38 is doped with ions of one or more rare-earth elements, such as Yb, Er, Tm, Nd and the like at a concentration varying between about 3000 ppm and about 5000 ppm. The core 38 being further doped with ions of germanium so that the core index profile includes a relatively low uniformly shaped refractive index region 44 running into a relatively high refractive index region 60 which has a generally frustoconical shape terminating in a flat top. Such a configuration was found advantageous because of increased mode field diameter of the fundamental mode.

Referring to FIGS. 9A-9C, minor 30 may be spherical or aspherical, segmented or not. In a preferred configuration, mirror 30 is configured with multiple segments 60 centered about a longitudinal axis 56 of the disclosed booster and configured with respective inner surfaces which define an opening 58 coaxial with the booster in the mounted position of mirror 30. The segments 60 are structured with respective slanted reflective surfaces 62 converging towards one another so as to define a generally frustoconical shapes reflective surface narrowing towards the output end of the disclosed booster. To accurately couple pump light in the inner sub-cladding of the disclosed booster 14, segments 60 may be pivotal about respective axes of symmetry 64 which are perpendicular to longitudinal axis 56.

Having described at least one of the preferred embodiments of the present invention with reference to the accompanying drawings, it is to be understood that the invention is not limited to those precise embodiments. Various changes, modifications, and adaptations including different wavelengths, fiber parameters and rare-earth dopants may be effected therein by one skilled in the art without departing from the scope or spirit of the invention as disclosed above.

The invention claimed is:

1. A single mode ("SM") ultra-high power fiber laser system, comprising:
   an unconfined delivery cable centered along a longitudinal axis;
   an elongated fiber booster extending through the delivery cable and structured with concentric and coextending multimode ("MM") core and at least one cladding around the MM core, the MM core being non-uniformly shaped and including a mode transition region expanding between small diameter input and large diameter output uniformly shaped MM core regions and configured so that as a SM signal light is guided in a propagating direction along the MM core, amplification of high order modes is substantially suppressed;
   a laser head directly receiving an output end of the booster;
   a plurality of unconfined pump light output fibers spaced from one another and from the delivery cable, each output fiber guiding MM pump light in the propagating direction; and
   a mirror mounted in the laser head ends and configured to redirect the pump light to the output end of the booster in a counter-propagating direction, wherein the booster emits the signal light in a kW to MW range in substantially the SM.

2. The fiber laser system of claim 1, wherein the pump light is coupled into an output end of the MM core.

3. The fiber laser system of claim 1, wherein the cladding of the booster is structured with
   a tapered region coextending with the mode transition region of the core, and
   an elongated inner ring extending along at least the tapered and large diameter output regions, the ring being structured with a refractive index lower than that of the cladding and splitting the cladding into inner and outer sub-claddings, the inner sub-cladding being adjacent to the MM and configured to receive the pump light, wherein a numerical aperture ("NA") of each of the pump light output fibers is at most a high as that of the inner sub-cladding of the booster.

4. The fiber laser system of claim 3, wherein the inner sub-cladding waveguides the coupled MM pump hit along a major length thereof, the tapered region of the cladding being structured with an opening angle selected to increase reflective angles of respective symmetrical and asymmetrical modes of the coupled pump light which are decoupled from the inner sub-cladding to the outer sub-cladding not before at least about 90% of the pump light is absorbed along the mode-transition region the core.

5. The fiber laser system of claim 4, wherein the opening angle is selected so that a tapering ratio of each of the core, inner cladding and ring is at least 2.

6. The fiber laser system of claim 4, wherein a ratio between diameters of respective inner sub-cladding and core corresponds to at least about 5, and a ratio between diameters of respective outer sub-cladding and core is about 10.

7. The fiber laser system of claim 3, wherein inner sub-cladding is structured with a NA of at least 0.22.

8. The fiber laser system of claim 3, wherein the ring region is doped with ions of fluoride.

9. The fiber laser system of claim 3, wherein opposite ends of the ring are about 15 µm thick and about 30 µm thick, respectively.

10. The fiber laser of claim 1 further comprising a plurality of light focusing assemblies each mounted to the laser head and operative to focus the pump light on the mirror so that the redirected pump light is coupled into the output end of the booster.

11. The fiber laser system of claim 10, wherein the light focusing assemblies receive respective output pump light fibers and configured to adjust outputs of respective pump lights each in an X-Y-Z system of coordinates.

12. The fiber laser system of claim 1, wherein the mirror includes multiple segments centered on a longitudinal axis of the booster and operative to displace relative one another about respective axes, which extend perpendicular to the longitudinal axis, so as to couple the MM light from respective pump sources into the output end of the booster.

13. The fiber laser of system of claim 12, wherein the segmented mirror is configured with a frustoconical shape narrowing towards the booster.

14. The fiber laser system of claim 1, wherein opposing surfaces of respective delivery cable and booster define a space therebetween.

15. The fiber laser system of claim 14 further comprising a cooling system located within the space.

16. The fiber laser system of claim 15, wherein the cooling system includes at least one pipe traversed by a cooling agent.

17. The fiber laser system of claim 15, wherein the cooling system includes a polymer coating coupled to an outer surface of the booster, the coating being configured with:
   a refractive index below about 1.33,
   an operating temperature of up to about a few hundreds of ° C., and
   a thickness ranged between about 6 to about 50 um.

18. The fiber laser system of claim 1 wherein the laser head is configured with a plurality of connectors receiving respective output ends of the pump light output and booster fibers.

19. The fiber laser system of claim 1 further comprising a main console configured with one or more cabinets which houses one or more pump sources emitting respective kW power MM pump lights, control electronic system and a master oscillator emitting the SM signal light, wherein the booster fiber and oscillator are coupled to one another in a master oscillator power amplifier ("MOPA") configuration.

20. The fiber laser system of claim 1, wherein outer diameters of respective small-end and large end of the tapered region of the cladding are about 200 μm and about 400 μm, respectively.

21. The fiber laser system of claim 1, wherein the core is doped with light activators selected from the group of rare earth ions which are doped at a concentration varying between about 100 ppm and about 10000 ppm.

22. The fiber laser system of claim 21, wherein the booster is configured with a refractive step index profile, the core being further doped with ions of germanium so that a refractive index profile of the core includes a relatively low refractive index region running into a relatively high refractive index region which has a generally frustoconical shape terminating in a flat top.

23. The fiber laser system of claim 1 further comprising an outer coating surrounding the cladding and having a thickness varying between about 20 μm and about 40 μm.

24. The fiber laser system of claim 1, wherein a length of the mode-transition region is about 4 meters and a total length of the core is between about 5 and about 7 meters at a power of the amplified SM signal light of about 20 kW.

25. The fiber laser system of claim 1 further comprising a coreless silica glass rod spliced to the output ends of the booster and pump light delivery fibers, respectively, and having a cylindrical cross-section or generally a conical cross-section.

26. The fiber laser system of claim 1, wherein the booster is configured with a one-piece structure or includes a plurality of parts fused together.

* * * * *